(12) United States Patent
Shahbazi et al.

(10) Patent No.: US 10,891,372 B1
(45) Date of Patent: Jan. 12, 2021

(54) SYSTEMS, METHODS, AND PRODUCTS FOR USER ACCOUNT AUTHENTICATION AND PROTECTION

(71) Applicants: Majid Shahbazi, Oakton, VA (US); Mahmood Shahbazi, Falls Church, VA (US)

(72) Inventors: Majid Shahbazi, Oakton, VA (US); Mahmood Shahbazi, Falls Church, VA (US)

( * ) Notice: Subject to any disclaimer, the term of this patent is extended or adjusted under 35 U.S.C. 154(b) by 235 days.

(21) Appl. No.: 15/828,626

(22) Filed: Dec. 1, 2017

(51) Int. Cl.
| | | |
|---|---|---|
| G06F 21/55 | (2013.01) | |
| G06F 21/88 | (2013.01) | |
| H04L 29/06 | (2006.01) | |
| H04L 9/32 | (2006.01) | |
| G06F 3/01 | (2006.01) | |
| G06Q 10/06 | (2012.01) | |
| H04W 12/12 | (2009.01) | |
| H04W 12/06 | (2009.01) | |
| H04W 12/08 | (2009.01) | |

(52) U.S. Cl.
CPC ............ *G06F 21/554* (2013.01); *G06F 3/016* (2013.01); *G06F 21/88* (2013.01); *G06Q 10/0635* (2013.01); *H04L 9/3297* (2013.01); *H04L 63/0815* (2013.01); *H04L 63/10* (2013.01); *H04L 63/1408* (2013.01); *H04L 63/168* (2013.01); *H04W 12/06* (2013.01); *H04W 12/08* (2013.01); *H04W 12/12* (2013.01)

(58) Field of Classification Search
CPC ........ G06F 21/554; G06F 3/016; G06F 21/88; G06Q 10/0635; H04L 63/10; H04L 9/3297; H04L 63/0815; H04L 63/168; H04L 63/1408; H04W 12/06; H04W 12/08; H04W 12/12
See application file for complete search history.

(56) References Cited

U.S. PATENT DOCUMENTS

| | | | |
|---|---|---|---|
| 5,875,296 A | 2/1999 | Shi et al. | 726/5 |
| 6,243,816 B1 | 6/2001 | Fang et al. | |
| 6,263,446 B1 | 7/2001 | Kausik et al. | |

(Continued)

FOREIGN PATENT DOCUMENTS

| | | |
|---|---|---|
| CN | 104778768 | 7/2015 |
| JP | 5802137 | 10/2015 |
| WO | WO 03/009621 | 1/2003 |

OTHER PUBLICATIONS

Shahbazi et al., U.S. Appl. No. 15/229,636, filed Aug. 5, 2016.
Shahbazi et al. U.S. Appl. No. 15/099,490, filed Apr. 14, 2016.

*Primary Examiner* — Huan V Doan

(57) ABSTRACT

Security layers for protecting a user account or credentials are disclosed. The layers involve the areas of: detection, access, deterrence and response. These layers may be used in various combinations for protecting a user account and are preferably customizable by the user. Invalid login attempts may be detected based on combination(s) of: authorized user input, metadata, connection risk factor, and one or more authentication factors. Examples of authorized user input selections may include: Scheduled Login, Enhanced Logout, Account Freeze, and various "Payback" options. In response to invalid login attempts, selected Payback options may be automatically sent to the requesting device—giving authorized users the ability to fight back against intruders.

20 Claims, 14 Drawing Sheets

(56) References Cited

U.S. PATENT DOCUMENTS

| | | |
|---|---|---|
| 7,360,096 B2 | 4/2008 | Bracewell et al. |
| 7,496,954 B1 | 2/2009 | Himawan et al. |
| 7,690,026 B2 | 3/2010 | Zhu et al. |
| 7,757,080 B1 | 7/2010 | Schilder .................. 713/162 |
| 8,024,781 B2 | 9/2011 | Saunders et al. |
| 8,327,141 B2 | 12/2012 | Vysogorets et al. |
| 8,490,200 B2 | 7/2013 | Rivera et al. |
| 8,551,186 B1 | 10/2013 | Strand |
| 8,555,079 B2 | 10/2013 | Shablygin et al. |
| 8,572,375 B2 | 10/2013 | Bishop et al. |
| 8,656,180 B2 | 2/2014 | Shablygin et al. |
| 8,661,254 B1 | 2/2014 | Sama |
| 8,701,013 B2 | 4/2014 | Cox et al. |
| 8,713,661 B2 | 4/2014 | Vysogorets et al. |
| 8,751,794 B2 | 6/2014 | Hauluund |
| 8,751,829 B2 | 6/2014 | Vysogorets et al. |
| 8,752,153 B2 | 6/2014 | Vysogorets et al. |
| 8,769,618 B2 | 7/2014 | Husemann et al. |
| 8,800,061 B2 | 8/2014 | Glave |
| 8,819,444 B2 | 8/2014 | Shahbazi et al. |
| 8,819,769 B1 | 8/2014 | van Dijk et al. |
| 8,826,019 B2 | 9/2014 | Shablygin et al. |
| 8,826,399 B2 | 9/2014 | Dorso et al. |
| 8,839,391 B2 | 9/2014 | Vysogorets et al. |
| 8,855,300 B2 | 10/2014 | Weis et al. |
| 8,861,724 B2 | 10/2014 | Weis et al. |
| 8,869,245 B2 | 10/2014 | Ranganathan et al. |
| 8,924,712 B2 | 12/2014 | Varadarajan et al. |
| 8,932,368 B2 | 1/2015 | Fitzgerald et al. |
| 8,935,777 B2 | 1/2015 | DeSoto et al. |
| 8,943,320 B2 | 1/2015 | Sabin et al. |
| 8,972,719 B2 | 3/2015 | Shablygin et al. |
| 9,177,169 B2 | 11/2015 | Shablygin et al. |
| 9,203,824 B1 | 12/2015 | Nunn et al. |
| 9,356,924 B1 | 5/2016 | Shahbazi et al. |
| 2003/0012382 A1 | 1/2003 | Ferchichi et al. |
| 2003/0164400 A1 | 9/2003 | Boyd ............................ 235/382 |
| 2003/0182551 A1 | 9/2003 | Frantz et al. |
| 2003/0195858 A1 | 10/2003 | Watanabe et al. .............. 705/75 |
| 2004/0098609 A1 | 5/2004 | Bracewell et al. |
| 2004/0148253 A1 | 7/2004 | Shin et al. |
| 2007/0033393 A1 | 2/2007 | Ganesan et al. .............. 713/155 |
| 2008/0134308 A1 | 6/2008 | Yalakanti et al. |
| 2008/0141351 A1 | 6/2008 | Park |
| 2008/0276308 A1 | 11/2008 | Graser et al. |
| 2009/0055642 A1 | 2/2009 | Myers et al. ................. 713/155 |
| 2009/0172795 A1 | 7/2009 | Ritari et al. |
| 2009/0249439 A1 | 10/2009 | Olden et al. |
| 2009/0328171 A1 | 12/2009 | Bayus et al. |
| 2010/0070759 A1 | 3/2010 | Leon Cobos et al. |
| 2010/0134299 A1 | 6/2010 | Fitzgerald et al. |
| 2010/0242101 A1 | 9/2010 | Reese, Jr. ......................... 726/6 |
| 2010/0306547 A1 | 12/2010 | Fallows et al. |
| 2011/0185401 A1* | 7/2011 | Bak .................... G06F 16/9024 726/5 |
| 2011/0219427 A1 | 9/2011 | Hito et al. |
| 2011/0277027 A1 | 11/2011 | Hayton et al. |
| 2013/0037429 A1 | 2/2013 | Sarnoff et al. |
| 2013/0183955 A1 | 7/2013 | Ron et al. |
| 2014/0182002 A1 | 6/2014 | Cox et al. |
| 2014/0189831 A1 | 7/2014 | Kemshall |
| 2014/0282923 A1 | 9/2014 | Narayan et al. |
| 2014/0298491 A1 | 10/2014 | D'sa |
| 2014/0338006 A1 | 11/2014 | Grkov et al. |
| 2015/0096004 A1* | 4/2015 | Zhou ................... H04L 63/1441 726/7 |
| 2017/0346809 A1* | 11/2017 | Plotnik ............... H04L 63/0815 |
| 2018/0046796 A1* | 2/2018 | Wright ................. H04L 9/3268 |
| 2018/0063164 A1* | 3/2018 | Balasubramanian ........................ H04L 63/1416 |
| 2018/0139221 A1* | 5/2018 | Chen .................. H04L 63/1425 |
| 2018/0288066 A1* | 10/2018 | Brockhuus ........... H04L 67/306 |
| 2019/0220580 A1* | 7/2019 | Brison ................... G06F 21/00 |

\* cited by examiner

Account Management GUI – 4000

4100
- "Book Your Next Login" | Time/month/day/hour/minute | Login window duration
- Enhanced Logout | Time/month/day/hour/minute
- Devices ☐ Account(s) ☐ IP Addresses ☐ Location(s) ☐ Apps/Websites ☐

4300
- Freeze
- Devices ☐ Account(s) ☐ IP Addresses ☐ Location(s) ☐ Apps/Websites ☐
- Device(s)/ able to access Account to unfreeze ☐

4500
- Threat Response/"Payback" options
- 1st unauth. attempt: Text warning | Vibrate
- 2nd unauth. attempt: Vibrate | Alarm | Flash Lights
- ....

Figure 4a

SYSTEMS, METHODS, AND PRODUCTS FOR USER ACCOUNT AUTHENTICATION AND PROTECTION

BACKGROUND

The present disclosure is related generally toward computer security and in particular toward authenticating and protecting user accounts and credentials.

SUMMARY OF THE INVENTION

User Account Security Suite

The present disclosure sets forth a suite of safeguards that may be implemented individually or collectively to create different layers of protection for user accounts. Generally speaking, these safeguards address the areas of: I) detection, II) access, Ill) deterrence, and IV) payback. In some cases, user accounts may be associated with a Single Sign On (SSO) account that can manage any of: device accounts, desktop accounts, web accounts, portal accounts, bank accounts, employee accounts, physical access accounts, etc. However, user accounts need not be a SSO account, but can be any type of account, including service accounts.

One primary goal is to provide authorized users with more control and options over their accounts and assets contained therein. In addition to detecting and deterring unwanted attacks, the suite offers payback options that enable users to actively protect their accounts and "fight back" against intruders.

The different layers and their functions will be briefly described as follows:

I. Detection Layer

As disclosed herein, detection involves initially identifying areas of suspicious login activity or attempts at the outset. Intruders constantly attempt different mechanisms to attack systems. Certain aspects of the disclosure address a dynamic intrusion detection (IDS) and authentication system. The system continuously gathers and analyzes information to identify possible security breaches such as intrusions (attacks from unauthorized intruders) as well as misuse (attacks from people close to the authorized user).

In some embodiments, the dynamic intrusion detection system may create comprehensive risk profiles for certain aspects of login attempts. Login attempts may include user login, user sign up, account recovery, etc. Comprehensive risk profiles may involve, but are not limited to: IP reputation, country or origin/Geo reputation, user reputation, account reputation, and device reputation. These risk profiles may, in turn, be used to calculate a Connection Risk Factor (CRF).

II. Access Layer

As disclosed herein, the access layer implements strong forms of authentication while giving authorized users more freedom and control over their accounts. Preferably, multiple factor authentication (MFA) is employed for logging in to the user's account. Typically, multiple authentication factors involve: something you know, something you have, or something you are. One MFA option disclosed herein includes "Scheduled Login," where only the authorized user knows when to login. Another MFA option includes "Account Freeze" where only a designated trusted device, for example, can access the user account.

Certain disclosed MFA options cause the user's account to become a moving target—making it more difficult to hack by intruders. Variations could be dynamic or static in nature, and include time (scheduled or unScheduled Login time), location (city, address, zip code from where future login will occur), IP address (from where future login will occur), Paired/Trusted device (from which devices future login will occur), etc.

III. Deterrence Layer

As disclosed herein, the deterrence layer serves to actively ward off intruders while providing authorized users with detailed information regarding potential attacks. Various options for deterrence may be available to the user in accordance with the present disclosure such as obtaining identifying photos of the requesting user and their surroundings as disclosed in U.S. patent application Ser. No. 15/229,636 filed Aug. 5, 2016 as incorporated herein by reference in entirety.

IV. Payback Layer

Advantageously, the payback layer provides authorized users a way to directly put intruders on notice and respond to attacks. Various options for payback may be available to the user in accordance with the present disclosure. Preferably, the user selects certain payback options to be sent to the requesting user and/or device. Payback options include, but are not limited to: device vibrate, screen shake, screen flash, screen zoom in/out, loud music, siren, loud and intimidating audible warning, text warnings, graphical warning messages, and more. The user may decide the level of payback as it is policy-based and user selectable. Advantageously, the user may select to send one or multiple payback actions to be executed on a hacker device and/or account (e.g., via email).

A. Ability to Fight Back

Until now, consumers and businesses have been on the receiving end of hack attacks. The payback layer gives the user power to fight back and protect their digital assets and/or security credentials. With payback, the user can let hackers know he is serious about his passwords and security. If an intruder tries to target a user's account, they may first receive a warning. If the intruder somehow came by user information in error, they will likely shirk away. If not—they become fair game.

B. Before- and after-Effects of Payback

Current prevention techniques involve establishing a security layer such a firewall or anti-virus software. However, these do not indicate the imminence of an attack or deploy counter-measures with pinpoint accuracy to strike the same target that broadcast and initiated the attacks. The present payback layer has an arsenal of predetermined responses that may be automatically fired off with the first attack. This "Before" payback effect is of paramount value where an enemy hacker understands that his position, location, and coordinates are exposed. At this point, the hacker realizes his choices are to: 1) continue the attack—and receive counter-measure attacks, or 2) abandon the attack and move on.

C. The Consent and Annoyance Factor

Hackers have become accustomed to launching hack attacks without facing: security resistance; intentional timed delays; and/or intimidating hit backs and responses from proactive security layers. Until now, attacks and penetrations have been unanswered and treated as a speed bump—rather than a full throttle reaction directed back at the intruder. Eventually, the intimidating nature of a loud siren, obnoxious music, screen shakes, flashing lights, and more will take their toll on the hacker. Moreover, the payback layer protects against the hacker's attack by treating such authentication requests as "high risk". In embodiments, these access requests may be dumped into the trash bin so that the hacker continues to re-submit in vain. The choices become: quit; or consent to legal action and continue—digging oneself more into the hole.

D. Communicate with Hacker

The payback layer collects incriminating evidence from the hacker including identifying information such as email address, IP address, MAC address, GPS coordinates, webcam photo, and more. Such information may be collected and combined from various sources such as the authentication request packet, URL strings and queries, software or instructions previously installed on the requesting device, etc. Upon multiple unauthorized attempts, the user will be able to send a warning message back to the hacker—notifying him that his email address and other identifying data are known.

V. Multiple Layers of Protection

The above aspects fully appreciate that hackers typically use multiple tools to attack. In response, a "multi-layered" approach to account security is provided so that other layers remain—even if one is penetrated. As a result, even hackers who employ a range of technologies to initiate their attacks are effectively warded off.

The present disclosure further understands that hackers do not typically stop with one user account. In some cases, multiple attacks may result in an outbreak. One aim, therefore, is to prevent such outbreaks before they happen. Important information regarding unauthorized log-in attempts may be obtained that can be quickly and effectively sent to an account owner and/or relevant authorities to stop intruders in their tracks. For example, authorities (service providers, employers, banks, parents, administrators, etc.) may be notified that there is a problem with one or more user accounts and are provided with vital information regarding the intruder(s), such as identifying information, where the attack originated from, and more.

In some embodiments, the user's account corresponds to a single sign-on (SSO) account. Thus, the user only needs to sign in once to a login server and then employ e.g., a graphical user interface specifically designed to manage all his other accounts. In this case, access to the user's account is only possible through the designated login server(s).

In further embodiments, an account management GUI is used to protect user accounts, passwords, devices, etc. Advantageously, users are conveniently provided with one or more graphical user interfaces, or "dashboards," for viewing account activity, controlling user settings, and/or interfacing with other online security features. It is also appreciated that the user's account activity may be monitored across multiple devices and platforms. In other words, the user's accounts and credentials on a login server are protected regardless of the device(s) used for access. Account activity information is collected and presented to the user in an easy to understand format. This allows the user to quickly find out "who" is attempting to log in to their account, as well as "where" and "how" the attempt occurred.

BRIEF DESCRIPTION OF THE DRAWINGS

Non-limiting and non-exhaustive embodiments are described with reference to the following figures.

DETAILED DESCRIPTION OF THE DISCLOSURE

Reference will now be made in detail to various exemplary embodiments of the disclosure, examples of which are illustrated in the accompanying drawings. The following detailed description describes certain embodiments of the invention, and should not be considered as limiting the invention to those embodiments. In addition, it is understood that "a" refers to one, or more; and that the terms "user device" and "user computer" are referenced interchangeably. Unless explicitly otherwise specified, "user" refers to an authorized user, and "hacker" or "intruder" are used to refer to a non-authorized user. It is appreciated that "requesting user" can refer to either an authorized user or a hacker/intruder.

The following description is presented to enable one or ordinary skill in the art to make and use the invention. Various modifications to the exemplary embodiments and the general features described herein will be readily apparent. It will be appreciated that the methods and systems will operate effectively in other implementations.

The embodiments will be described with respect to systems or devices having certain components. However, the systems and/or devices may include more, or less, components than those shown, and variations in the arrangement and type of the components may be made without departing from the scope of the invention.

It is appreciated that the present disclosure may be applied as part of an overall Single Sign On (SSO) user account management suite. (Using SSO, an authorized user only needs to login once to a login server and can manage all of his other accounts from there). However, it should be appreciated that the principles disclosed herein may be applied to protect any user account and/or credentials examples including Yahoo™ Mail, Gmail™, Facebook™, banking application, etc. Such applications or products could use an API/SDK to extend the principles of the present disclosure to their own customers. Alternatively, they could use the principles herein as standalone, or as part of an SSO suite.

Advantageously, the present disclosure gives authorized users the power to let intruders know that they are serious about their account security and have the ability to follow through. Authorized users can set up their accounts such that anyone trying to illicitly access their account will be put on notice and pursued.

Figure 1A:
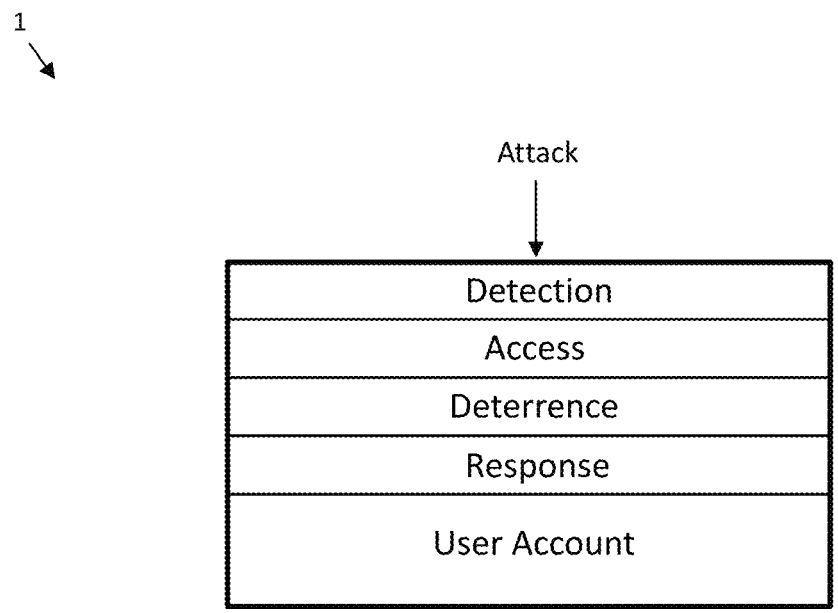
FIG. 1a illustrates a conceptual view of multiple layers of defense and protection for a user account in accordance with the principles of the present disclosure.

Turning now to the figures, which depict various exemplary embodiments of the invention, FIG. 1a shows a conceptual illustration of multiple layers of defense 1 available herein as part of a user account security suite. The different layers include: Detection, Access, Deterrence, and Payback—and refer to the functions performed in that layer. It is appreciated that multiple options may be available to the user within each layer and correspond to various embodiments of the disclosure.

The layers (and options therein) may be implemented independently, or in concert with one another, and are preferably configurable by the user. While each layer is intended to independently deter or thwart attacks, using multiple layers together causes the user's account to be practically impenetrable. It is also appreciated that different combinations of layers may be implemented in accordance with the principles herein.

Figure 1B:
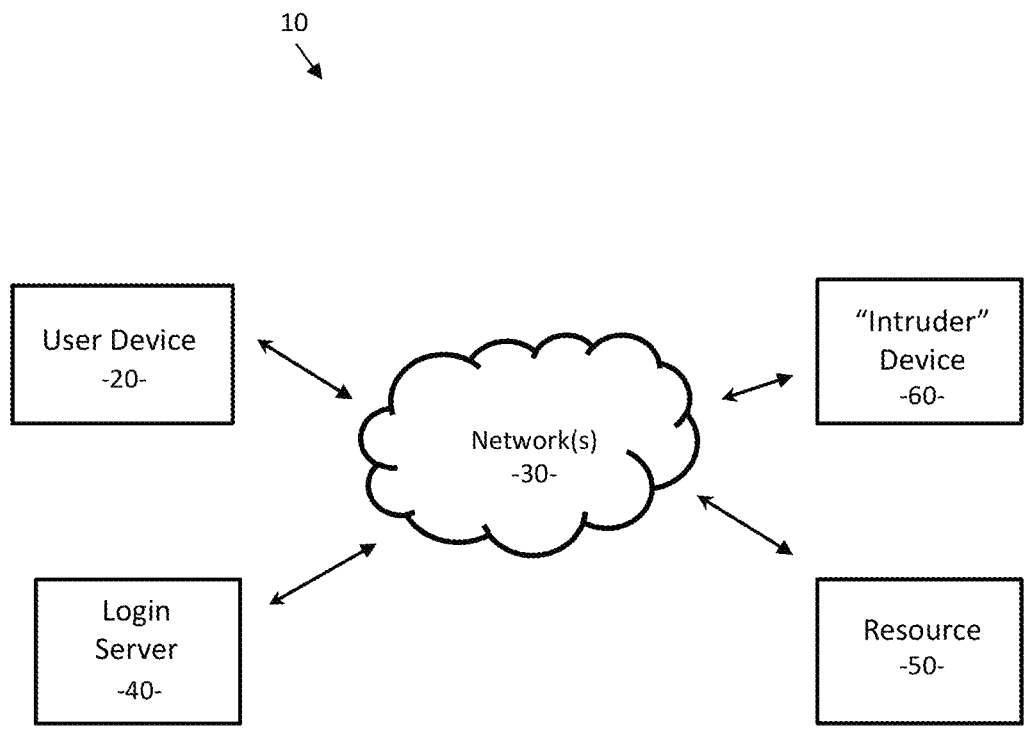
FIG. 1b illustrates an exemplary network environment in accordance with the present disclosure.

FIG. 1b shows a block diagram of an exemplary system 10 in which the present disclosure may be practiced. As illustrated, the system 10 includes one or more user device(s) 20, a login server 40, and one or more online resources 50 connected over one or more networks 30. It is understood that an authorized user has a login account with the login server 40 and may also be termed "user" hereafter for simplicity. It is further understood that the login server 40 may comprise one or more associated servers/databases/datastores (not shown) necessary for maintaining secure user accounts, however for simplicity purposes, will be referred to here as "login server" 40.

Typically, the user logs in to their account via any device 20 having a user interface and Internet connection capability. Thus, the user device 20 may encompass a PC, a laptop, desktop, smart phone, game system, wristwatch, secure entry door, ATM, vending machine, or any other similar device.

It is also worth noting that the user device 20 may be operated by either an authorized user, or unauthorized user (e.g., if stolen or borrowed). Thus, a determination should be made as to whether a login attempt to the user's account is valid. As disclosed herein, such a determination may be made based on: user account settings (such as Scheduled Login, Account Freeze), metadata obtained regarding the login attempt, one or more authentication factors, and/or connection risk factors.

Alternatively, since a hacker or intruder could request access to the user's account via their own device 60, it is important to note that the user's account on server 40 is what is being protected—not necessarily the user device 20 itself.

Therefore, since the device used to request access may be either the user's device 20 or the intruder's device 60, it will hereafter be referred to as "requesting device" 20 or 60, or 20/60.

The requesting device 20/60 and the login server 40 are composed of a variety of hardware and software. Preferably, the devices 20/60 comprise: one or more processors, one or more transmitters and receivers, a power supply, storage media, memory/RAM, and input/output device(s). Input/output devices may include a: keyboard, microphone, speaker, touch screen, stylus, mouse, display, front facing camera, rear facing camera, scanner, etc. Requesting devices may also include data interface(s), such as IR, USB, firewire, Bluetooth, etc. Preferably, the devices 20/60 include a graphical user interface and web browsing capabilities such as provided by Internet Explorer, Firefox, Chrome, Safari, or the like.

It will be appreciated that network 30 may comprise any combination of LANs, WANs, MANs, the Internet, Intranets, private networks, wired and/or wireless (e.g., IEEE 802.11 standard, satellite, cellular, GSM/GPRS, 3G, 4G, CDMA, TDMA) networks, mobile networks, public switched telephone networks (PSTN), SMS, SMSC, MMS, SMTP/MIME and/or IM distribution networks, or any other suitable network arrangements. Communication links (depicted by double arrows) may include transmission links such as wired, wireless, fiber-optic, mobile, and the like.

It is understood that login server 40 is not limited to a single server and may comprise more than one physical or virtual servers in one or more locations. For example, network 30 may encompass any combination of one or more: on-premise, public or private cloud hosting platform, or service for data processing and/or storage or other functions.

Device Components/Modules

Figure 2A:
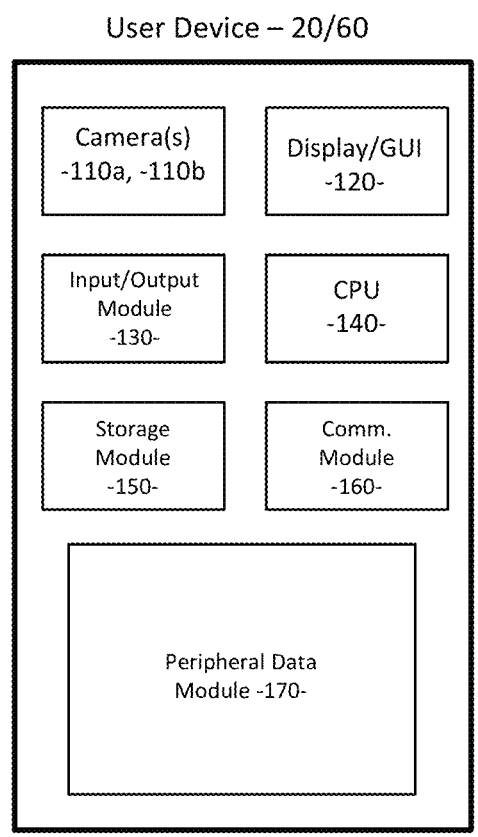
FIG. 2a illustrates an exemplary block diagram of user device components in accordance with principles of the present disclosure.

FIG. 2a is a block diagram depicting exemplary requesting device 20/60 components. Preferably, the requesting device 20/60 may include: one or more associated camera(s) 110, a display/GUI module 120, an input/output module 130, a CPU 140 having browser software, a storage module 150 having non-volatile memory for storing computer instructions, communication module 160, and peripheral information module 170. As used herein, peripheral information generally comprises information surrounding the requesting device 20/60. For example, audio or video of the surrounding environment. In some cases, the peripheral information module 170 may have been provided by the login server 40 (in the form of software or instructions) upon registration, etc.

The device 20/60 modules are in communication with one another using any combination of hardware and software as will be appreciated by those skilled in the art. It is further appreciated that there may be overlapping of functions between the different modules and that some of the disclosed functions may be performed by a combination of modules.

In embodiments, a front facing camera 110a on requesting device 20/60 can be instructed to obtain an image of the user. In other embodiments, a rear facing camera 110b can be instructed to obtain an image of the user's surroundings. The display/GUI module 120 may display information to the requesting user as well as provide for interaction with the requesting user. The input/output module 130 may obtain settings from the user. Additionally, the input/output module 130 may work with display/GUI module 120 to display information to the user. In addition to camera(s) 110, input/output device(s) associated with module 130 include inter alia, microphones, touch screens, keypads, thermocouples, biometric readers, etc. Communication module 160 allows the requesting device 20/60 to communicate with network(s) 30 (e.g., the Internet, cell network(s), etc.) as well as obtain GPS information from satellites.

Figure 2B:
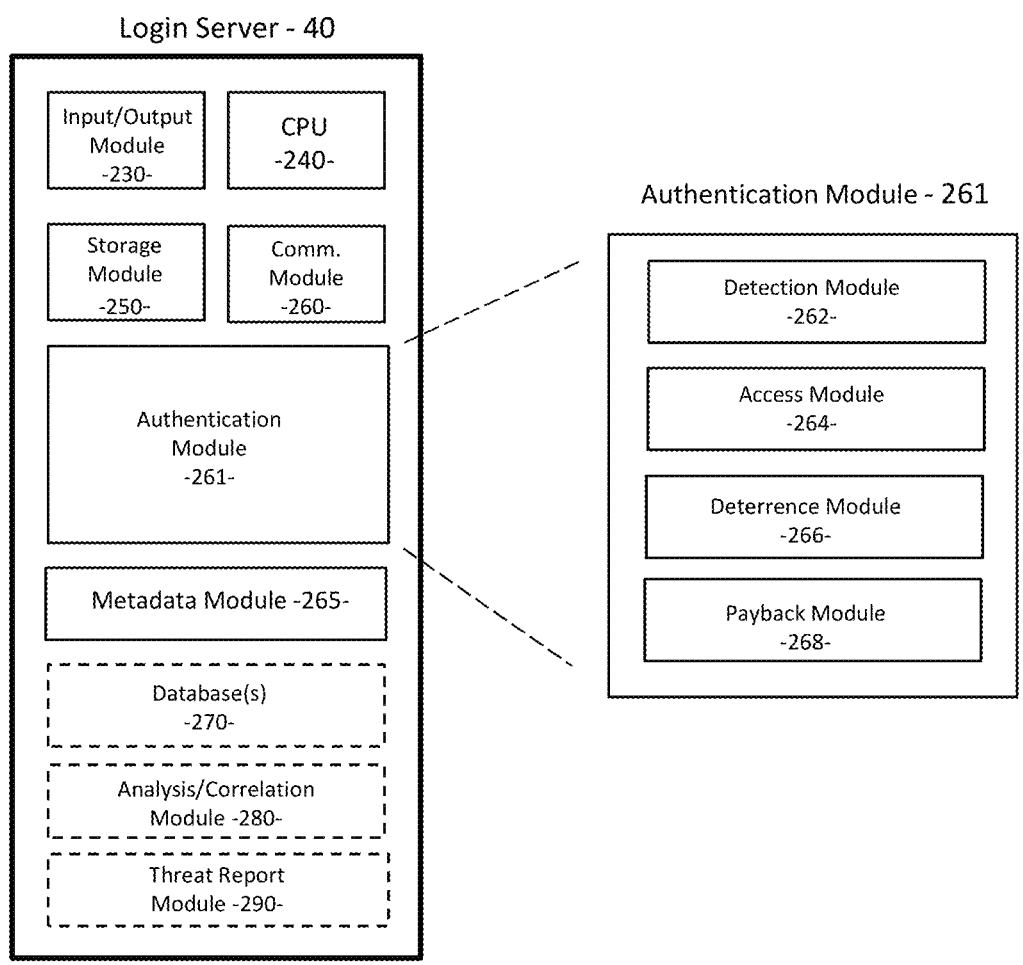
FIG. 2b illustrates an exemplary block diagram of login server components in accordance with principles of the present disclosure.

As also shown in FIG. 2b, the login server 40 of the present disclosure may comprise inter alia: input/output module 230, a CPU 240, storage module(s) 250, communication module 260, an authentication module 261, metadata module 265, and optionally (as indicated by dashed lines) one or more collocated/or remote databases 270, Analysis/correlation module 280, and Threat report module 290.

Communication module 260 performs communication with requesting device 20/60 over one or more networks 30, such as the Internet, Intranets, Private networks, Public networks, etc. Communication module 260 may also communicate with one or more external databases (not shown) over network(s) 30. Communication module 260 encompasses inter alia communication ports, network interface cards, transmitter(s), receiver(s), GPS antenna, etc.

Storage module 250 comprises internal and/or external storage and may include access to one or more local or distributed servers and/or databases/datastores 270. Analysis and correlation module 280 may use additional software instructions, e.g., for image analysis, facial recognition, voice recognition, fingerprint analysis, retinal scan analysis, GPS coordinate/physical address mapping, artificial intelligence, and more. For example, the analysis and correlation module 280 may translate GPS coordinates and superimpose the address where the login attempt occurred on a map for user convenience. The threat report module 290 may compile login attempts over a determined time period to convey number and/or frequency of login attempts to the user's account. For example, the amount of login attempts may be graphed per month to show how recent activity compares to previous months, etc.

As shown in FIG. 2b, authentication module 261 may further comprise several optional submodules including: detection module 262, access module 264, deterrence module 266, and payback module 268. It is appreciated that the depicted modules may be physically together or separate, but are in communication with one another to achieve the principles and functions of the present disclosure. These sub-modules will be discussed in more detail below.

Detection Module—262

Preferably, this module includes a dynamic intrusion detection system (IDS) that listens for patterns of intrusion to user accounts. Various detected login attempts may include user login, user sign up, account recovery, and more.

In embodiments, the detection module 262 includes a risk profiler. The risk profiler is configured to calculate risk factors for: IP address, Geo/Country/Region/City, userid, user account, user device, and more. A connection risk factor (CRF) is then computed by weighting and adding the individual risk factors. As indicated herein, the higher the CRF, the riskier the request. The CRF may be continuously updated so that the risks for IP address, Geo/Country/Region/City, userid, etc. are up-to-date and accurate.

As mentioned, risk profiles may be created based on inter alia: IP reputation, Geo/Country/Region/City reputation, user reputation, account reputation, device reputation, and more. Non-limiting examples of some risk profile factors will be discussed as follows.

IP Reputation

IP reputation helps to understand the risk associated with a requesting IP address. When assigning a risk factor to IP reputation, considerations herein include: whether the IP address is known by the authentication server—or whether it is a new IP address; whether the requesting address is known to the authentication server—or is new; when the user was last able to successfully login from the current IP address (e.g., 1, 7, 30, 180, 356 days—or more); the routing distance between the current IP address and the last successful login IP address; repeated probes from the same IP address on different registered user accounts; the number of failed logins from the same IP address; different IP addresses requesting access to the same user account within a predetermined range of time, etc.; excessive failed login attempts from a single IP address or range of addresses (indicating a DoS attempt or privilege escalation attempt); login/signup/password recovery frequency; whether the IP address for the current connection attempt was the same for the last successful login; and multiple login attempts with valid username and wrong password. Additionally, all failed login attempts during a certain period of time will be thrown into a holding-status basket as these may be associates of the same IP address that are part of the same group of concentrated large scale attack such as a DoS.

Geo/Country/Region/City Reputation

The originating Geo/Country/Region/City of the login request may be obtained from the geolocation latitude and longitude provided by GPS data or based on the IP address geolocation. The Geo/Country/Region/City Reputation risk profile may thus be based on some of the following factors: whether the Geo/Country/Region/City of the request is known to the authentication module—or whether it is new; whether the Geo/Country/Region/City is new for the userid; the physical distance between the current geolocation and the last geolocation used, etc. Additionally, whether this Geo/Country/Region/City has been associated with any known hack attacks on local, or other, networks.

Userid Reputation

Another risk factor profile may be created for the userid. For example, does this user have a lot of failed login attempts? What is the number or percentage of successful vs. failed login attempts for this user? Does this user enter wrong passwords a lot? How many times has this user reset his password?

User Account Reputation

In addition to evaluating userid, a risk profile for the user account itself may be created. Some considerations include: Does the account adhere to security best practices? The account may be evaluated for how well it has been maintained and ranked with a detailed ranking system. For example, does the user leave the account open at all times without logging out at the end of their session or shift? Has the account been unused for an extended period of time? Have logins occurred during hours other than non-working hours? Have logins occurred from strange locations? How long this user has been a member of this service? Is intruder a new comer or has he/she been there for months? How many Apps (web accounts) does the user have, meaning how many passwords of this user are protected by the login server? Does the user engage this account regularly to login to his websites via SSO? If not, this may mean that he does not typically use SSO to authenticate to other websites for conducting his daily life.

Device Reputation

Additionally, a risk profile for the device used to login may be created. Some considerations include: whether the device has been trusted by anyone or whether it is a new device; whether the user has logged in from this device before; whether the user has registered this device as a trusted device; whether the device has been used recently, and more.

Calculating Risk Factors and the Connection Risk Factor (CRF)

To quantify the above risk factors, each of the questions/considerations for each category may be rated and scored in a normalized manner. The individual risk factors may then be added (and in some cases weighted—as will be appreciated by those skilled in the art) to obtain an overall connection risk factor (CRF). The CRF serves to provide an indication as to the validity of the login request. For example, the higher the CRF, the riskier the request. In turn, different adaptive factors and access permissions may be assigned based on the CRF. For example, given a high CRF, access may automatically be denied, whereas for a moderate CRF, access may be granted, but with few user permissions, and so forth.

Access Module—264:

An authorized user may log in to their account via the login server 40 using a variety of login methods. Such login methods may involve passwords, passcodes, passphrases, pin numbers, optical codes, digital certificates, tokens, fingerprints, touch ID, PhotoLogin, Selfie, mobile device, or the like. It is appreciated that authentication and/or authorization of the user may happen behind the scenes using any combination of standard or non-standard authentication protocols including, but not limited to: OpenID, SAML, OASIS, Kerberos, or the like.

Preferably, access to the user account requires multiple factor authentication (MFA). In general, MFA typically involves: something you know, something you have, or something you are. Some examples of multiple factor authentication disclosed herein may include the following:

I. Scheduled Login (e.g., "Book Your Next Login")

In one preferred embodiment, authorized users are able to schedule, or "book" their next login time (e.g., through an account management GUI 4000). Since only the user knows the login time (as scheduled beforehand), hackers will not be able to guess the access time. Other variable "scheduling" factors may include: device(s) used to login, IP addresses, locations, and more. Essentially, this makes the user's account a moving target that is more difficult to access or predict. Such a feature is based on Social Science theories of unpredictability—where emotional inconsistency makes one's behavior harder to guess beforehand. Applied to the digital realm, providing users the ability to "book" their next login brings unpredictability to account access as well as authentication. This unpredictability makes accounts more difficult to be targeted and hacked.

Traditional web login methods are highly susceptible to attack because the login window or "entranceway" is always visible and ready for anyone to submit an access request. As a result, hackers know where to submit a request and try to hack. However, with Scheduled Login, hackers that come along may see a "fake" login window that goes to nothing. On the surface hackers may think they are submitting passwords; in reality, the login server 40 will treat these requests as "high risk," and be denied.

For example, with Scheduled Login, at the predetermined time the user will be able to access a "real" login window. After the login time has ended, a "fake" login window appears, and unauthorized users will be unable to be authenticated. Outsiders won't be aware of the Scheduled Login time—or that one even exists. This means that access times are unpredictable. On the surface everything appears normal, but attempts to log in by intruders will be blocked. Behind the scenes, the login server 40 treats these requests as "high risk," and denies entry. After attempting to login, the intruder will only see a message to the effect of "invalid user ID or password." Meanwhile, the login server 40 records every such attempt in an "Activity Log" and extracts pertinent metadata.

A. Flexible Authentication

Besides unpredictability, Scheduled Login (or logout) results in another benefit. It provides flexible MFA where dynamic security factors (e.g., login time, device, IP address, location)—are solely at the user's discretion and convenience. The user can decide to schedule a login from a desktop for a certain time (e.g., during work hours), and next time from a trusted mobile device (e.g., during lunch). The following time, the user may schedule login from a laptop with a unique IP address (e.g., during travel). All of these are interchangeable. It is further appreciated that "Flexible Authentication" can be accomplished based on any of: i) specific dates and times; ii) specific device(s); iii) specific IP address(es); iv) specific location(s); v) access to an App(s)/website(s).

B. Enhanced Logout

Similar to Scheduled Login, Enhanced Logout causes the legitimate login window to "disappear." As a result, intruders will face an impenetrable wall (or security layer) once the user has accessed their account. Referring to a physical analogy, a person enters their house through a door. Even if the person locks the door once inside, outsiders can still "see" the door—and know that entrance is possible. Likewise, in the digital realm, intruders and hackers can see the door to your account and know where to try and break in. With Enhanced Logout, once a person has logged in, and/or at a prescheduled time, the login window "disappears." Intruders won't know about your login window or authentication time—or that such a possibility even exists.

II. Account Freeze

In another preferred embodiment, authorized users have the ability to "freeze" access to their accounts for as long as they wish. Anytime a user anticipates suspicious activity (while traveling, using public WiFi, etc.), they can freeze access to their account from any device, and decide for how long, via a management user interface or dashboard. Once an account is frozen, no transactions or other activity can occur until the account is unfrozen. A user could also specify that access from personal computers is prohibited, while access from a trusted mobile device is permitted (e.g., to unfreeze the account).

According to various embodiments, the user may select Account Freeze from the account management GUI 4000, from a "Failed Login" message or email received from the login server 40, or other provided means. For example, an Account Freeze button may be provided (with the default set to 'disabled'). Preferably, the Account Freeze status is performed by the user and ends at a specific date and time (such as Jan. 10, 2018 at 5:00 PM). The user may select a date and time as he wishes. In this example, the account will be in freeze status until Jan. 10, 2018 at 5:00 PM. At 5:01 PM, the account status will automatically be changed to unfreeze.

Further options for Account Freeze include:
Temporary=For a time period
Partial=For a portion of the account
Full=For a whole account
Freeze my account until: I unfreeze it
Freeze my account until: Date & Time
Freeze my IP Address
   Freeze all other IPs excluding mine
   Freeze certain IP address (after Starbucks)
Freeze my Device
   Freeze all other Devices excluding mine
   Freeze certain Devices (library, friend's PC)
Freeze my location
   Freeze all other locations except mine
Freeze Access to an App/website
   For example, I use Facebook once a month. Why does it have to be available at other times, when someone could inadvertently access that same account while I am not even using it. Using the Freeze API/SDK, I can freeze access to this App/website.

Preferably, when user's freeze their account, no one else will know it is frozen. Any attempts to login by an intruder will be automatically blocked (although on the surface things may appear normal). Unwanted login attempts may be flagged as "high risk" and further cause collection of information about the intruder without their knowledge.

III. Optical Login

The access module 264 is not limited to Scheduled Login or Account Freeze in terms of multiple factor authentication. Many other MFA methods may be used in accordance with the present disclosure. For example, in some embodiments, PhotoLogin and/or optical codes may be used as described in U.S. application Ser. No. 14/304,076, filed Jun. 13, 2014, now U.S. Pat. No. 9,356,924, issued May 11, 2016, as incorporated herein by reference in entirety.

Deterrence Module—266:

As previously mentioned, deterrence serves to actively ward off intruders while providing authorized users detailed information regarding potential attacks. Various options for deterrence may be available to the user in accordance with the principles of the present disclosure.

In addition to obtaining information about login attempts, deterrence involves obtaining information surrounding the attempt. If an intruder attempts to gain unauthorized access to a user's account, peripheral information may be obtained from the intruder's device. Peripheral information may include, inter alia: a photo/video of the user, a photo/video of the user's surroundings, the user's GPS location, a date/time stamp, the IP/network address where the attempt was made, surrounding temperature, and more. This information may be used to make inferences such as identifying landmarks in the surrounding video and correlating with network address, etc. Additionally, facial image analysis or obtained biometric data may be used to personally identify the user. Faced with identifying information regarding the attack (such as photos of the intruder in the act), potential hackers are effectively deterred. Analysis results may further be displayed to the authorized user on a graphical user interface. In this way, the user is provided with a wealth of information collected any time an attempt is made to access their account.

Payback Module—268:

In addition to providing users with information surrounding an attack, the payback module provides users a way to directly respond to attacks. Intruders are immediately put on notice that the user is aware of their attempts to hack the user's account. The intruders are then given an option to stop and walk away. If they ignore the warning and continue, every subsequent movement will correspond to a "consent." By continuing their attacks, intruders acknowledge and agree to receive paybacks from the user.

The payback module 268 provides authorized users a way to reach out to intruders and fight back. For example, the user can set up their account so that anyone trying to use an unauthorized password gets actively thrown off. In other words, the user can cause the intruder's device to continuously vibrate, play an obnoxious sound, flash screen, and more. How long, or how loud, the sound plays or the device vibrates is customizable by the user—providing them with a sense of satisfaction. According to embodiments, the user may input settings 4500 (e.g., via their account management dashboard 4000) so that payback responses to intruders are automatic and the user does not need to do anything else. The user may be initially presented with various settings on the dashboard such that different responses occur with each attempt. Alternatively, default settings may be maintained. Responses may increase in intensity for each invalid login attempt. (Similarly, the responses may increase for valid login attempts as well. For example, if a friend, partner, or colleague of the user has access to the user's device but may not know the password or MFA requirements). In any event, the first time an intruder attempts to access an authorized user's account, they will receive a warning on their device. If they somehow came to the user's account in error, they will likely shirk away. If not, they will be put on notice and continue to receive even stronger responses.

Advantageously, users can obtain metadata about both the attack and the intruder. For example, if an intruder attempts to gain unauthorized access to a user's account, the payback module 268 may instruct the requesting device 20/60 to obtain/submit photos, audio, video, GPS location, IP address, and other metadata. Other metadata may include: IP address, MAC address, a unique device ID, hardware information, software information, device environment, users, email addresses, contact information, phone numbers, the type of connection (WiFi, cellular, etc.), device ID (IMEI, MEID, etc.), phone number of the device (MSISDN), an email account associated with the device, apps installed on the device, language/country code, location of the device (latitude/longitude), Service Provider, whether SMS is provided, and more.

The payback module 268 further accounts for hacker psychology and behavior. If an intruder targets a user's account, they may first receive a warning. If the login attempt was accidental, they will likely shirk away. If it was not, their information is fair game. Even if hackers try to mask their IP address or GPS location, other useful metadata can be obtained and inferences made. Causing hackers or intruders to wonder what else you have at your disposal plays on their fears. Once they catch on that you can trace their activities, hackers will be more likely to move on to another account that is easier to target.

Moreover, since the user's account is on a secure network, the intruder's metadata can be collected for legal action and may even be published for public consumption. No intruder wants to see a list of their own metadata broadcast to the public.

In embodiments, a multi-tiered warning process is employed. Depending on the intruder's actions, different responses are triggered. Upon an incorrect login, a first warning may be issued—giving the requestor a chance to correct the input and/or pair their device. Upon another incorrect entry, a "trespassing" warning may be given. In addition to subsequent warnings, various combinations of alarms, flashing lights, vibration, etc. may be issued to the intruder. Each time an incorrect login attempt occurs, the warnings may become increasingly intense.

Method Steps Performed by Each Layer

FIGS. 2*c-f* show flow diagrams of method steps performed in accordance with the Detection module 262, Access module 264, Deterrence module 266, and Payback module 268, respectively.

Figure 2C:
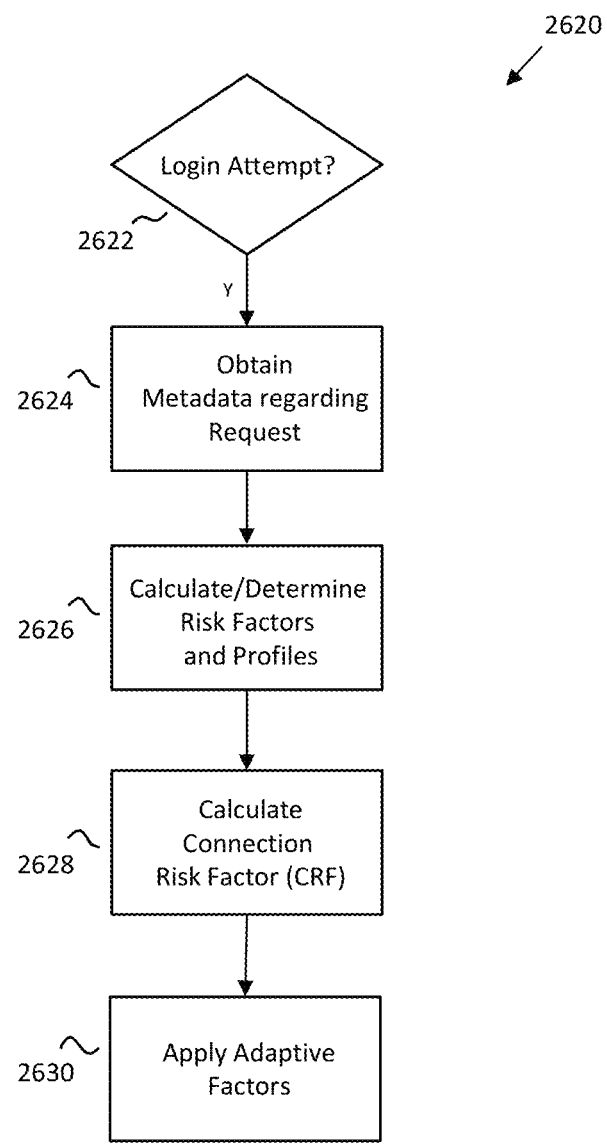
FIG. 2c shows an exemplary flowchart of computer implemented method steps in accordance with a detection module of the present disclosure.

In FIG. 2*c*, exemplary method steps 2620 associated with detection module 262 are disclosed. After detecting a login attempt 2622, metadata regarding the request is obtained (step 2624). Metadata may be obtained from multiple sources such as: network/routing information, TCP/UDP information, authentication protocols, URL strings/queries, login server 40 registration information, information obtained from the requesting device 20/60 via instructions previously downloaded from the login server 40, and more.

Such metadata may include inter alia: photos, audio, video, GPS location, IP address, MAC address, a unique device ID, hardware information, software information, device environment, users, email addresses, contact information, phone numbers. Other metadata that may be collected include: identifying the MAC address of the WiFi access point, the type of connection (WiFi, cellular, etc.), device ID (IMEI, MEID, etc.), phone number of the device (MSISDN), an email account associated with the device, apps installed on the device, language/country code, Service Provider, whether SMS is provided, and more. Based on the obtained metadata, dynamic risk factors may be quantified and profiles determined in step 2626. Once the risk profiles are determined, a connection risk factor (CRF) is calculated (e.g., by weighting and adding the individual risk factors). Step 2628. Various adaptive factors may further be applied in step 2630 based on the CRF. For example, for a high CRF equating to "high risk" access may be denied; for a moderate CRF, access may be granted, with strict permissions, and so on.

Figure 2D:
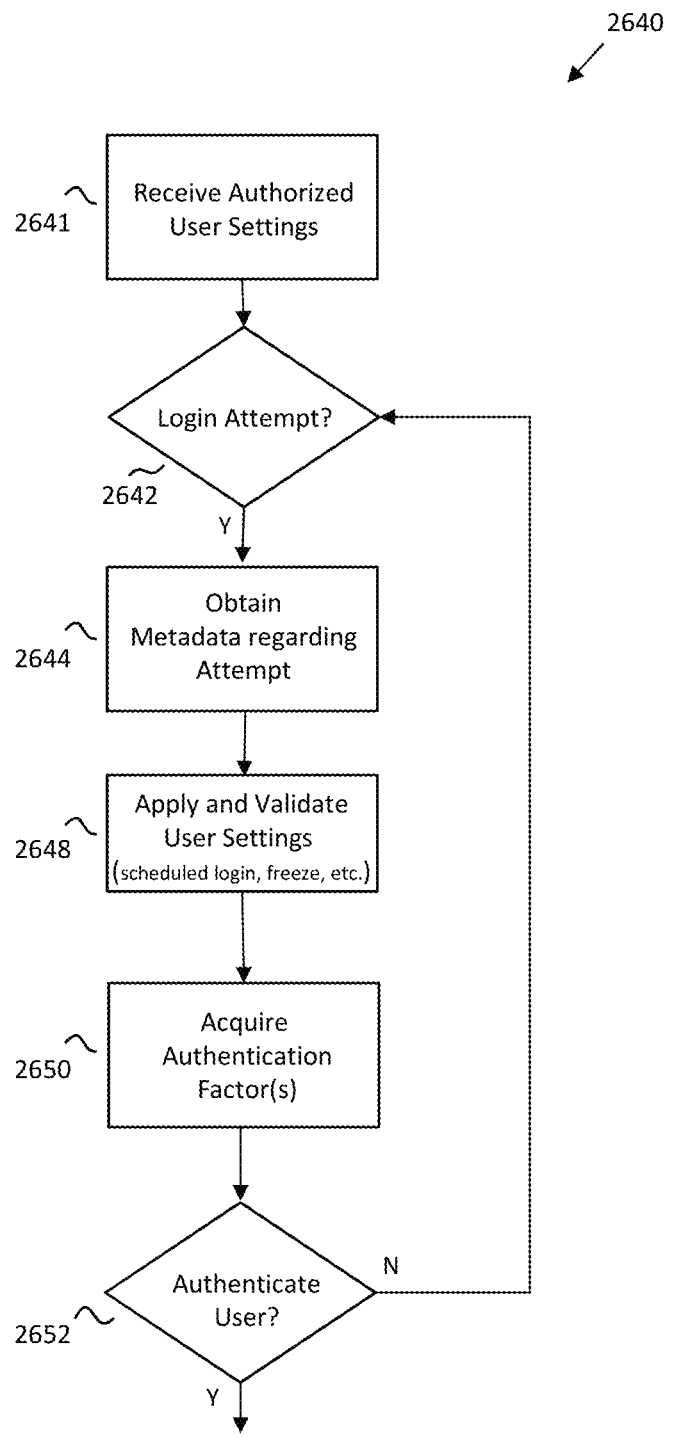
FIG. 2d shows an exemplary flowchart of computer implemented method steps in accordance with an access module of the present disclosure.

FIG. 2d shows exemplary method steps 2640 associated with access module 264. Authorized user settings 2641 may be received at any time, but are generally received during initial user registration. If a user fails to input these settings, default settings may automatically be used. Following a detected login attempt 2642, metadata regarding the login attempt is obtained (step 2644). Metadata may be obtained from multiple sources such as: network/routing information, TCP/UDP information, authentication protocols, URL strings/queries, login server 40 registration information, information obtained from the requesting device 20/60 via instructions previously downloaded from the login server 40, and more. Such metadata may include inter alia: photos, audio, video, GPS location, IP address, MAC address, a unique device ID, hardware information, software information, device environment, users, email addresses, contact information, phone numbers. Other metadata that may be collected include: identifying the MAC address of the WiFi access point, the type of connection (WiFi, cellular, etc.), device ID (IMEI, MEID, etc.), phone number of the device (MSISDN), an email account associated with the device, apps installed on the device, language/country code, Service Provider, whether SMS is provided, and more.

In step 2648, authorized user settings are applied and validated. Such user settings may include, Scheduled Login times, Account Freeze indications, required authentication factors, and more. For example, if the authorized user has indicated in 2641 to freeze their account, any login attempts received from untrusted devices will be treated as invalid. In another example using Scheduled Login, any login requests outside the schedule login timeframe are treated as invalid. In step 2650, authentication factors are received from the requesting user and/or device and a determination made in 2652 whether the login request is valid.

Figure 2E:
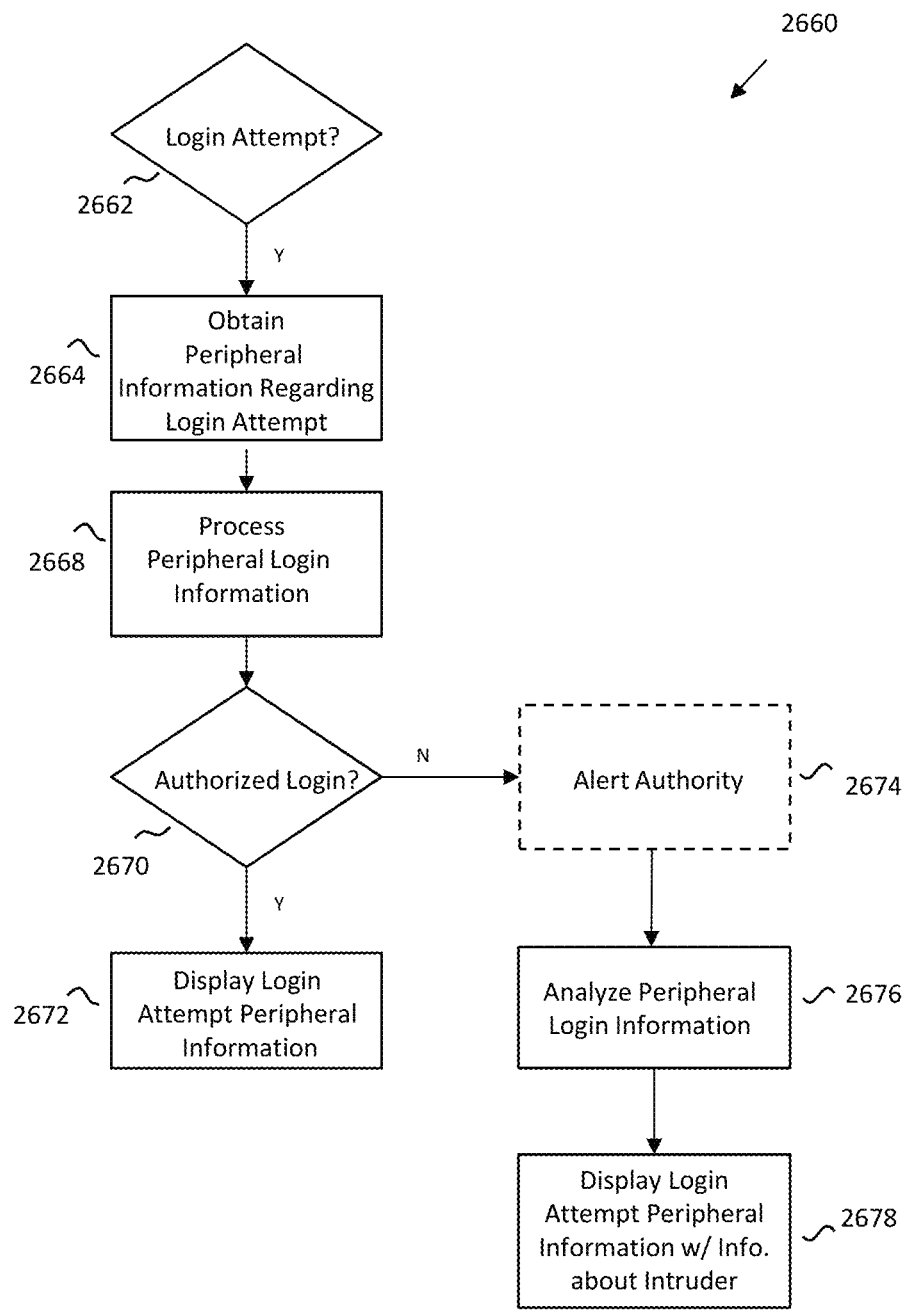
FIG. 2e shows an exemplary flowchart of computer implemented method steps in accordance with a deterrence module of the present disclosure.

FIG. 2e shows exemplary method steps 2660 in accordance with deterrence module 266. Following an attempt to access a user's account 2662, peripheral information surrounding the login attempt is obtained 2664. According to preferred embodiments, the requesting device 20/60 contains software or instructions previously downloaded, or obtained, from the login server 40. Upon obtaining the instructions and registering with the login server 40, the login server 40 may obtain certain information from the requesting device 20/60. For example, the instructions may give the login server 40 permission to access certain components to obtain peripheral information surrounding the requesting device 20/60 such as front facing and rear facing camera(s), GPS data, sound modules, and more.

In embodiments, obtained information (such as photos of the user or their surroundings) may be processed and used to determine the identity of the requesting user e.g., with image analysis, facial recognition, artificial intelligence, or the like (step 2668). A determination is made at step 2670 as to whether the user is authorized for login. If the user is authorized, processed information may be readily displayed to the user at 2672. If, at step 2670, the user is not authorized, authorities may optionally be automatically notified 2674.

In step 2676, the obtained information is analyzed by the login server 40. In addition, the information may be combined, processed and/or correlated with other information from other databases to make further inferences about the requesting users' identity or location.

Steps 2672 and 2678 both instruct the login server 40 to display the analyzed information to the user. The login attempt information and processed information is displayed on a "monitoring" graphical user interface 5000 described later.

As mentioned, the login server 40 may perform additional analysis of the information received from the user device 20/60. In one example, image analysis or facial recognition software may be used to help identify who the user in the photo/video is as will be appreciated by those skilled in the art. Likewise, image recognition software may be used to identify landmarks in photos/video of the user's surroundings. If fingerprint, retinal scan, or other biometric data is obtained, the login server 40 may perform image analysis of this as well. If GPS data is obtained, the login server 40 may consult information from external map, or address, databases to translate the GPS data into a physical address and/or superimpose the user's location on a map. In addition, the login server 40 can correlate information obtained from diverse sources to make further inferences as to the requesting users' identity and/or location.

Figure 2F:
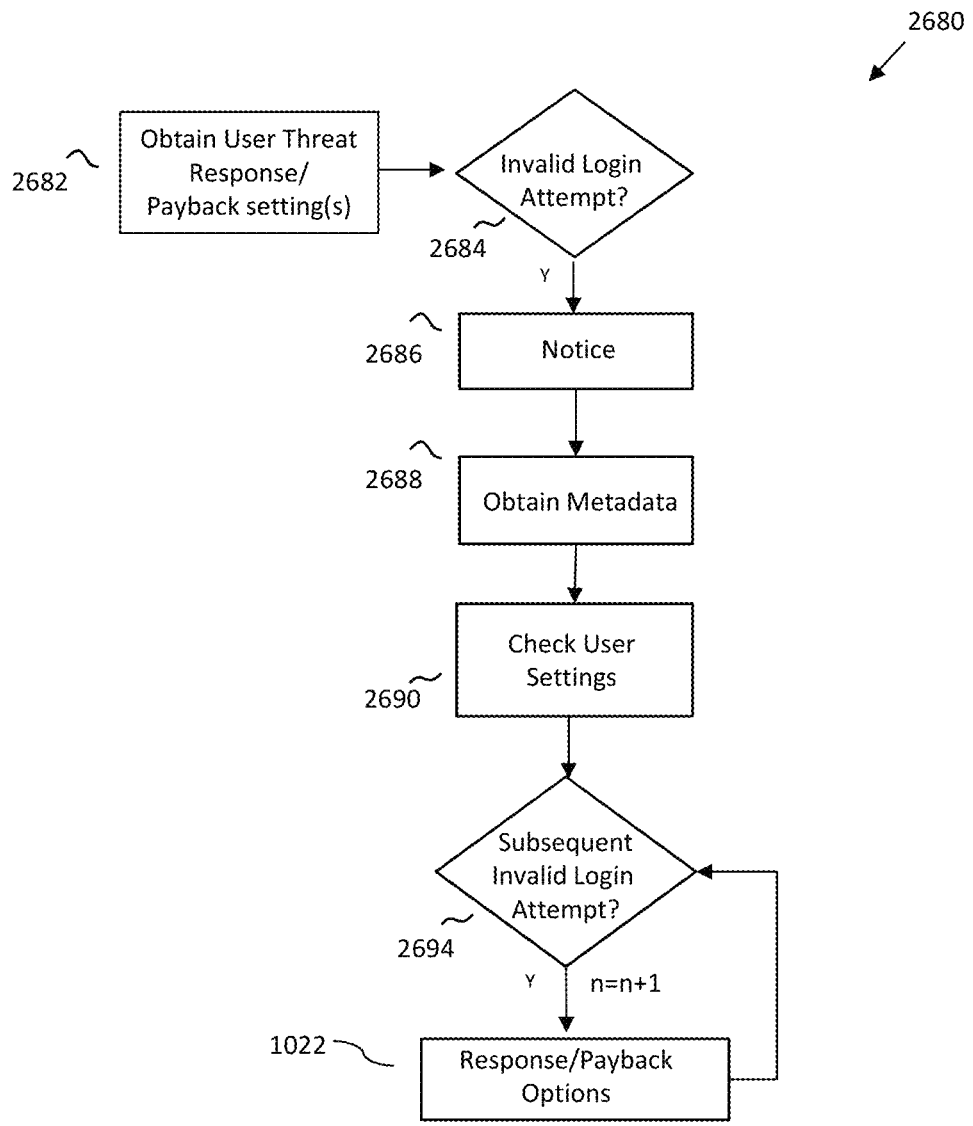
FIG. 2f shows an exemplary flowchart of computer implemented method steps in accordance with a payback module of the present disclosure.

FIG. 2f shows an exemplary flow diagram of computerized method steps 2680 performed in accordance with the payback module 268 of the disclosure. At step 2682 initial user settings for a user's account are obtained by the login server. Preferably, the settings are obtained through a graphical user interface 4500 and managed by payback module 268. At 2684, a login attempt is detected and a determination made whether it is valid. If the login attempt is invalid, a "notice" may be sent to the requesting device 20/60 at step 2686. In some cases, such a notice may be a friendly indication that an error has occurred.

Upon a first invalid login attempt by the requesting user 20, the login server 40 may begin to obtain various metadata from the requesting device 20/60 (step 2688). This may, or may not, be done with the requesting user's knowledge. Metadata may include: IP address, MAC address, a unique device ID, hardware information, software information, device environment, users, email addresses, contact information, phone numbers. Other metadata that may be collected include: identifying the MAC address of the WiFi access point, the type of connection (WiFi, cellular, etc.), device ID (IMEI, MEID, etc.), phone number of the device (MSISDN), an email account associated with the device, apps installed on the device, language/country code, location of the device (latitude/longitude), Service Provider, whether SMS is provided, and more. If the requesting user has attempted to mask certain information such as their IP address or GPS coordinates, other metadata may be used to reconstruct and/or deduce the requestor's identity, location, etc.

In 2690, the login request is checked with the user's account settings. In some cases, the requesting device 20 may be a new or unrecognized device that is being introduced by the authorized user. If the user is able to successfully pair the new device, the user should be able to go on to login to his account. If unsuccessful, another notice may be sent to the requesting device 20/60.

For subsequent invalid login attempts 2694, various customized payback options may be applied by the login server 40 to the requesting device 20/60. It is appreciated that the authorized user may have previously set trigger levels and/or alarm options for their account (e.g., upon registration). Alternatively, default settings may be applied.

For each subsequent attempt, different "payback" responses may be set. Additional response options include inter alia: sending response(s) to the requesting user's email and/or devices; blocking the requesting user's email/devices/network address; sending the requesting user's metadata/identifying information to authorities; publishing the requesting user's metadata/identifying information for public consumption. For example, sending response(s) to the requesting user's device(s) may include: sounding an alarm, causing the device to vibrate or the screen to shake, playing loud music, turning on the flashlight—anything to draw attention to and annoy an unauthorized user.

In some cases, Payback options may vary between a computer, laptop, and a mobile device. For example, a mobile device itself can be caused to "vibrate" whereas the same options may not be available in a PC, and may need to be replaced with screen shake. Regardless, various combinations of alarms, messages, and required user actions may be sent to the requesting device 20/60. In embodiments, the alarms and messages may become more intense for each subsequent attempt.

Hereafter it will be appreciated that the above security layers (and corresponding modules) may be combined in a variety of manners. Preferred embodiments of combined layers will be addressed below.

Figure 3A:
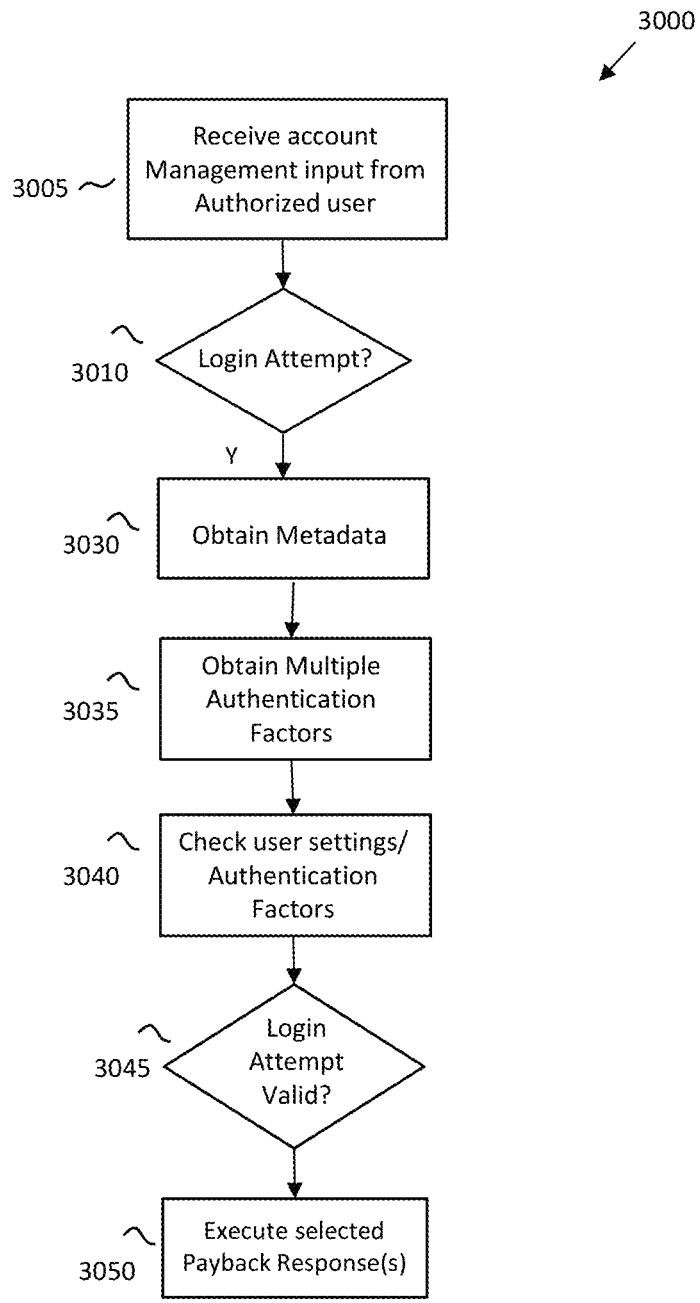
FIG. 3a shows an exemplary flowchart of computer implemented method steps in accordance with one preferred embodiment of the present disclosure.

FIG. 3a illustrates one preferred embodiment 3000 that may be performed by implementing various features of the above security layers together. In step 3005, account management settings are received from the authorized account user (e.g., via account management GUI 4000). Account management settings may include: Scheduled Login timeframe(s), Account Freeze options, Enhanced Logout, trusted device designations, payback settings, MFA settings, among others. At step 3010, a login attempt is detected. Metadata regarding the login attempt is obtained in step 3030. Metadata may include IP address, MAC address, a unique device ID, hardware information, software information, device environment, users, email addresses, contact information, phone numbers. Other metadata that may be collected include: identifying the MAC address of the WiFi access point, the type of connection (WiFi, cellular, etc.), device ID (IMEI, MEID, etc.), phone number of the device (MSISDN), an email account associated with the device, apps installed on the device, language/country code, location of the device (latitude/longitude), Service Provider, whether SMS is provided, and more.

In step 3035, multiple authentication factors are obtained. For example, one authentication factor may include passwords, passcodes, passphrases, pin numbers, optical codes, digital certificates, tokens, fingerprints, touch ID, or the like. A second authentication factor may then include: Scheduled Login time(s), optical codes, or certain: locations, IP addresses or devices known only to the authorized user. The obtained metadata and/or authentication factors may then be checked with the authorized user settings in 3040. For example, if the user has scheduled a login for a certain timeframe, the timestamp associated with the login request will be checked to see if it falls within the timeframe input by the user.

If the login request does not match the user input settings, or is not able to provide the two or more required authentication factors, the request will be deemed invalid in 3045. In other words, the determination may be made based on a combination of: the authorized user's input settings and obtained the authentication factors. If the request is invalid, payback response(s) 3050 may be executed in accordance with the authorized user's selections.

According to a preferred embodiment, method steps may include: providing a server that manages a user account and configured to perform the following steps: a) Receive input from an authorized user of the account regarding account login settings and threat response settings; b) Detect a login attempt to the user account from a requesting device over a computer network; c) Obtain metadata regarding the login attempt over the computer network; d) Obtain two or more required authentication factors from the requesting device over the computer network; e) Determine whether the login attempt to the user account is valid or invalid based on a combination of at least: the authorized user input and the two or more required authentication factors; and Upon an invalid login attempt to the user account, the server automatically sending one or more response(s) to the requesting user over the computer network based on: identifying information obtained at least in part from the obtained metadata; and the threat response settings.

Figure 3B:
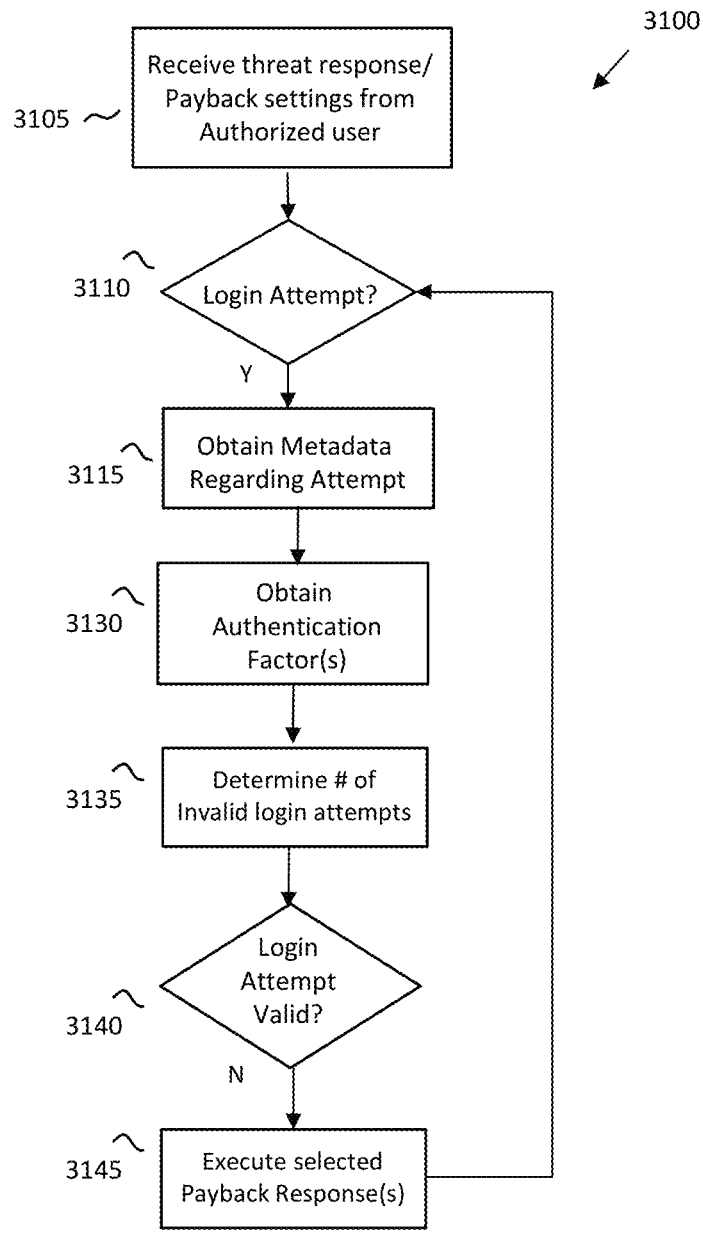
FIG. 3b shows an exemplary flowchart of computer implemented method steps in accordance with another preferred embodiment of the present disclosure.

FIG. 3b illustrates another embodiment 3100 that may be performed by implementing various features of the above disclosed layers. In step 3105, threat response settings (e.g., payback options) are received from the authorized user. At 3110, a login attempt is detected and metadata regarding the login attempt obtained 3115. In step 3130, one or more authentication factors are obtained. A running count of the number of invalid login attempts within a certain timeframe is further determined in step 3135. At step 3140 a determination is made as to whether the login attempt is valid based at least on the one or more authentication factors. For example, if the correct password is provided, but the authorized user has frozen their account, a login request from an untrusted device may deem the request invalid. Based on the number of invalid login attempts, and the threat response settings received in 3105, various payback responses may be sent to the requesting device and/or user 3145. For example, it is appreciated that "payback" responses may become more intense for each subsequent invalid login request. Payback responses may be sent to the requesting device based on the obtained metadata (such as IP address, MAC address, email address, phone number, device ID and more). Even more, payback responses may be sent to an account associated with the user of the requesting device (such as email, text, etc.).

According to another preferred embodiment, method steps may include: providing a server that manages a user account and configured to perform the following steps: a) Receive input from an authorized user of the account regarding threat response settings; b) Detect a login attempt to the user account from a requesting device over a computer network; c) Obtain metadata regarding the login attempt over the computer network; d) Obtain one or more required authentication factors from the requesting device over the computer network; e) Determine the number of invalid login attempts that have been made to the authorized user's account within a predetermined timeframe f) Determine whether the login attempt to the user account is valid or invalid based at least on the one or more required authentication factors; and Upon an invalid login attempt to the user account, the server automatically sending one or more response(s) to the requesting user over the computer network based on identifying information obtained at least in part from the obtained metadata; and wherein the type of response is dependent upon the number of invalid attempts that have been made within the predetermined timeframe and the threat response settings.

Figure 3C:
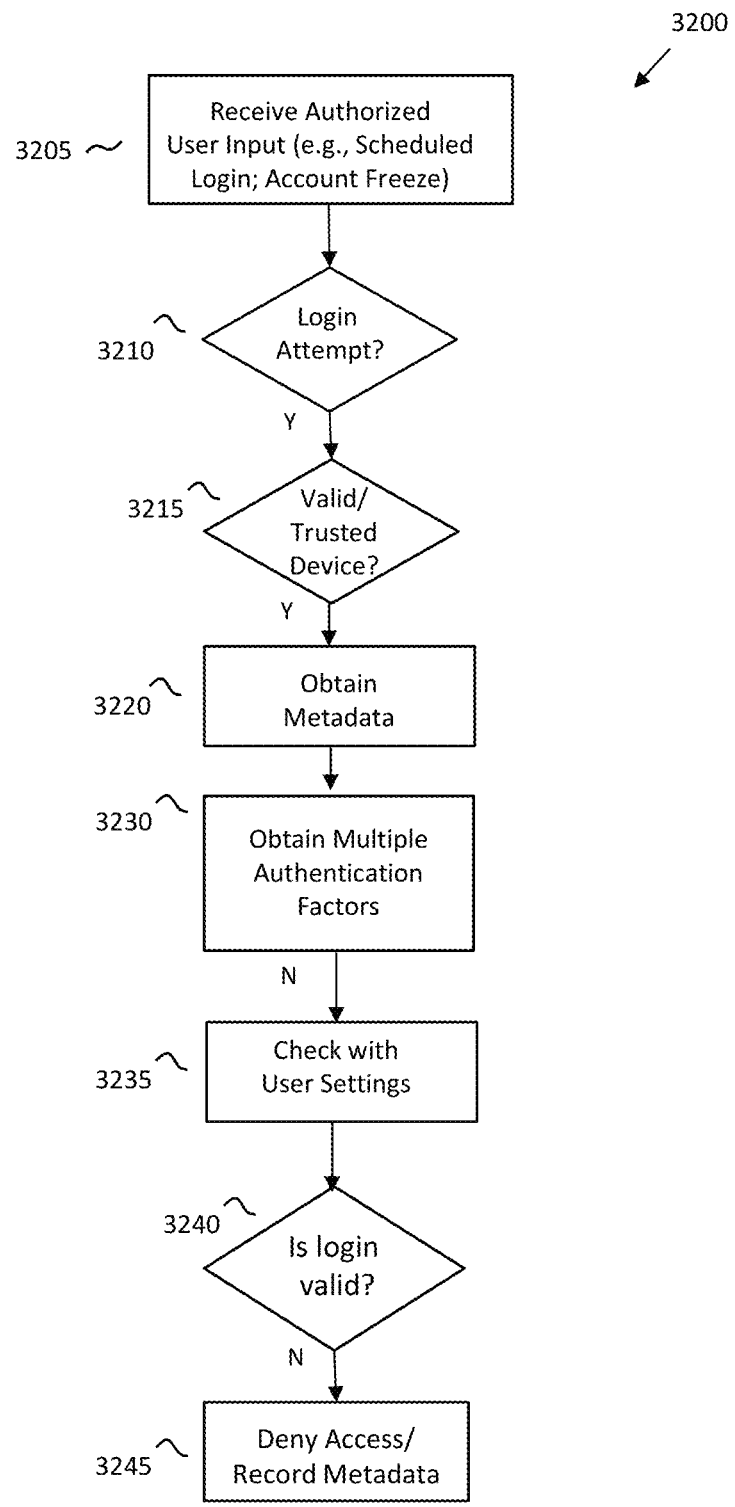
FIG. 3c shows an exemplary flowchart of computer implemented method steps in accordance with another preferred embodiment of the present disclosure.

FIG. 3c illustrates yet another embodiment 3200 that may be performed by implementing various features of the above disclosed layers. In step 3205, authorized user input is received (e.g., a Scheduled Login window timeframe, Account Freeze, etc.). In 3210, a determination is made as to whether a login attempt has occurred. A determination may also be made in 3215 as to whether the requesting device is a trusted device. In 3220, metadata regarding the login request is obtained. Multiple authentication factors are subsequently obtained in 3230. In step 3235, the login request may further be checked against the authorized user settings (e.g., Scheduled Login, Account Freeze). A determination is then made in step 3240 as to whether the login request is valid based at least on the multiple authentication factors. If the request is deemed invalid, access will be denied and metadata/identifying information recorded in step 3245.

In one detailed example, account login settings may refer to Scheduled Login timeframes. These Scheduled Login timeframes may also correspond to a "second" authentication factor that only the authorized user knows. With Scheduled Login, once the login timeframe starts, a "real" login window is available to the authorized user. This may correspond to respective login ports on the server being opened, a login window made visible on a respective GUI, or the like. When the scheduled timeframe is over, the real login window "disappears" and a "fake" login window provided. Any attempts by an unauthorized user to log in via the "fake" login window will be automatically denied.

According to yet another preferred embodiment, method steps may include: Providing a server that manages a user account and configured to perform the following steps: a) Receive selected input from an authorized user of the account regarding account login settings; b) Detect a login attempt to the user account from a requesting device over a computer network; c) Obtain metadata regarding the login attempt over the computer network; d) Obtain two or more required authentication factors from the requesting device over the computer network; e) Determine whether the login attempt to the user account is valid or invalid based on at least the two or more required authentication factors; and Upon an invalid login attempt to the user account, the server automatically denying access to the requesting device and recording identifying information about the user of the requesting device derived at least in part from the obtained metadata.

User Dashboards

Figure 4B:
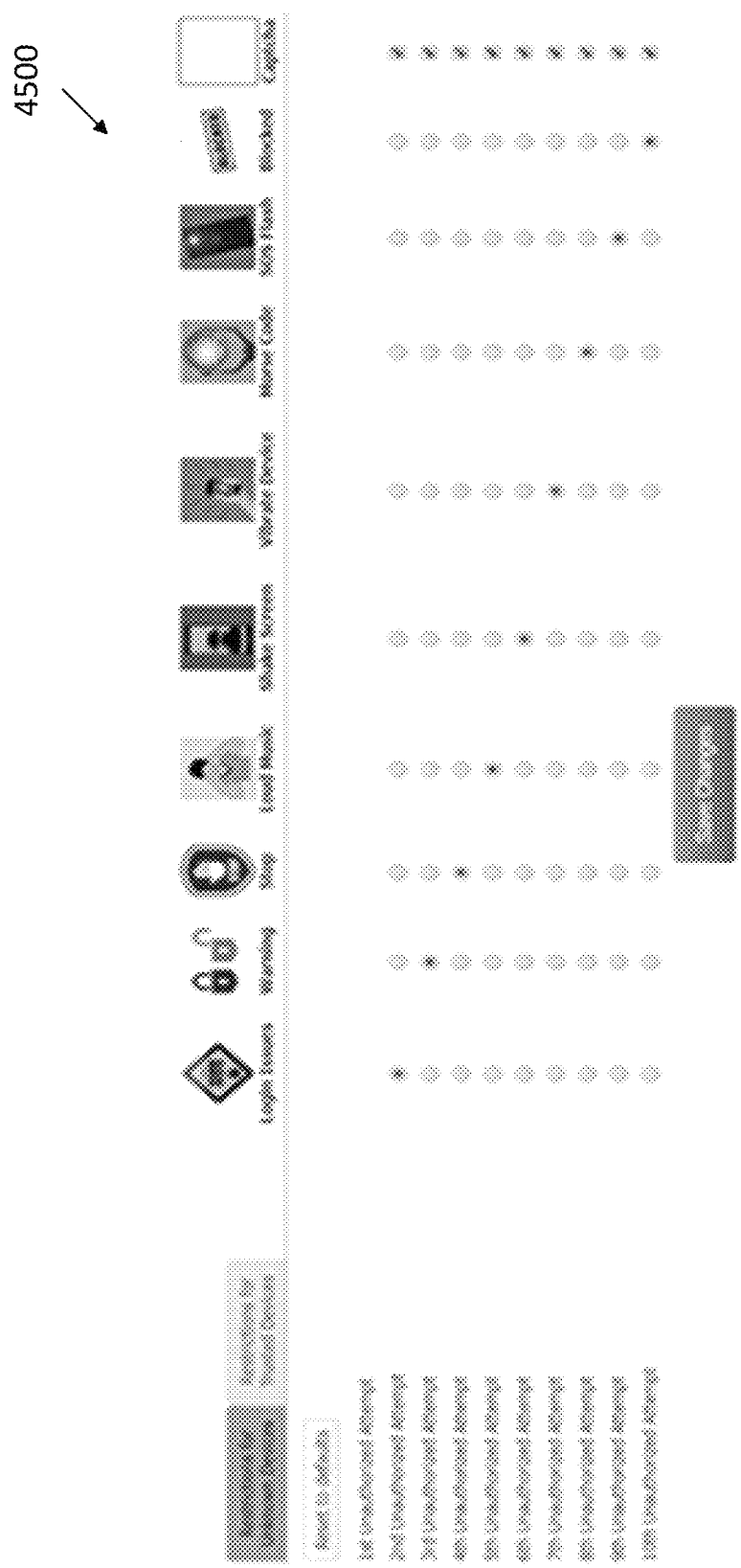
FIGS. 4a and b illustrate "management" graphical user interface displays according to various embodiments of the disclosure.

FIG. 4a illustrates a "management GUI" 4000 that may be used to configure the login server 40 to set Scheduled/Flexible Login variables(s) 4100, set Account Freeze options 4300, and/or set various Payback/response options 4500. The GUI 4000 may also be used to set alert levels regarding login attempts to the user's account, set types of metadata to collect if an alert is triggered; set types of information to display regarding login attempts; and more. In this way, authorized users are provided more flexibility and control over their accounts.

According to other aspects of the disclosure, payback dashboard options 4500 may further be provided to allow authorized users to "reach out" to intruders to put them on notice and thwart their attacks. The user is provided various settings that can cause the intruder's device to continuously vibrate, play an obnoxious sound, and more. How long, or how loud, the sound plays or the device vibrates may be customizable by the user. Alternatively, the user can refer to default settings. The user does not need to do anything else. The present disclosure automatically puts an intruder on notice anytime a breach occurs.

In certain aspects, the graphical user interface provides easy and convenient account management capabilities for the authorized user. In embodiments, the authorized user may be able to set different trigger levels and/or conditions for acquiring login data and other metadata. For example, an authorized user may indicate via the managing graphical user interface to obtain metadata when login attempts arise from certain IP addresses, countries, etc. In further embodiments, metadata data can be correlated or statistically mapped to identify anomalies and/or generate threat reports and/or put intruders on notice.

Figure 5:
FIG. 5 illustrates a "monitoring" graphical user interface according to various embodiments of the disclosure.

FIG. 5 illustrates an exemplary "monitoring GUI" 5000 in accordance with the principles of the present disclosure. In this embodiment, a graphical user interface displaying account activity and threat reports is shown. The graphical user interface 5000 comprises: means for displaying information regarding the identity of requesting user(s); means for displaying location(s) of requesting user(s); and means for displaying additional peripheral information regarding login attempt(s).

In embodiments, the means for displaying the location includes displaying the physical location of the requesting user superimposed on a map. In other embodiments, the means for displaying the location includes displaying the network location of the device implemented by the requesting user to attempt to access the user's account. In still other embodiments, the means for displaying the location involves displaying images of the user's surroundings obtained by one or more cameras associated with the requesting device.

In further embodiments, the "monitoring GUI" 5000 correlates login attempt information to create and display a threat report indicating recent login attempts to the user's account. In yet other embodiments, the graphical user interface is configured to automatically alert predetermined authorities on behalf of the authorized user regarding unauthorized login attempts.

It is understood that the method steps and modules of the present disclosure may be performed using any combination of hardware and/or software as will be appreciated by those skilled in the art. Preferably, instructions residing on computer readable media configure the user device and/or login server to execute the method steps. Such instructions may be in the form of an API, SDK, plug-in, add-on, download, or the like and may also contain additional hardware and/or software instructions for performing the disclosed method steps.

The disclosed modules may take the form of computer executable instructions executed by one or more computer or other devices. Program modules may include programs, routines, objects, data structures, etc. for performing particular tasks. Functionality of the modules may be combined or distributed as desired in various embodiments. Such instructions may be in the form of an API, SDK, plug-in, add-on, download, or the like. Software instructions may further include custom macros, sub-routines, logic, or the like implemented using commercially available software such as MS SQL Server™, Visual Basic, C, C++, SMIL, XML, HTML, XHTML, OpenID, SAML, Java, JavaScript, C #, APIs, etc.

As set forth above, the present disclosure provides multiple security layers as part of an overall user account/credential management suite.

The foregoing discussion of the preferred embodiments has been presented for purposes of illustration and description. It is not intended to be exhaustive or to limit the scope of the disclosure to the above examples. Many variations and modifications of the embodiments described herein will be apparent to one of ordinary skill in the art in light of the present disclosure. For example, additional security layers may be added to the server 40 and/or authentication module 261.

The invention claimed is:

1. A computerized system for protecting an online account of an authorized user, the system comprising:
 a login server having at least one hardware processor configured to:
  manage the online account, wherein the authorized user has personal assets maintained in the online account;
  communicate with one or more computer devices operated by the authorized user over one or more computer networks;
  display, on the one or more computer devices, a graphical user interface to the authorized user, wherein the graphical user interface provides the authorized user with control over multiple different protection layers of the online account;
  receive, via the graphical user interface, input from the authorized user that indicates one or more predetermined login parameters, wherein the authorized user enters or changes the one or more predetermined login parameters for the online account prior to a subsequent login;
  provide a fake login access to the online account until the one or more predetermined login parameters inputted by the authorized user have been met;
  provide a real login access to the online account when the one or more predetermined login parameters have been met; and
  determine the login request to be invalid when a login request to the online account is received via the fake login access.

2. The system of claim 1, wherein the one or more predetermined login parameters inputted by the authorized user corresponds to a scheduled login time that the authorized user desires to login to their account in the future, and wherein the hardware processor configured to provide real login access to the online account at the scheduled login time.

3. The system of claim 1, wherein the one or more predetermined login parameters inputted by the authorized user corresponds to one or more IP address from which the authorized user desires to login to the online account in the future.

4. The system of claim 1, wherein the one or more predetermined login parameters inputted by the authorized user corresponds to a particular device from which the authorized user desires to login to the online account in the future.

5. The system of claim 1, wherein the one or more predetermined login parameters inputted by the authorized user corresponds to a geographical location from which the authorized user desires to login to the online account in the future.

6. The system of claim 1, wherein the one or more predetermined login parameters inputted by the authorized user corresponds to account freeze options including: account freeze duration or devices authorized to unfreeze the account.

7. The system of claim 1, wherein the hardware processor further configured to receive, via the graphical user interface, input from the authorized user indicating one or more payback options to be sent to a device requesting access to the online account, wherein the graphical user interface enables the authorized user to input or change one or more payback options that are to be initiated at the requesting device.

8. The system of claim 7, wherein the hardware processor further configured to determine a request to be invalid and initiate the one or more payback options when a device not operated by the authorized user sent the request to access the online account.

9. A computer-implemented method for protecting an online account of an authorized user, the method comprising:
 managing, by a login server, the online account, wherein the authorized user has personal assets maintained in the online account;
 communicating, by the login server, with one or more computer devices operated by the authorized user over one or more computer networks;
 displaying, by the login server, a graphical user interface to the authorized user, wherein the graphical user interface provides the authorized user with control over multiple different protection layers of the online account;
 receiving, by the login server via the graphical user interface, input from the authorized user that indicates one or more predetermined login parameters, wherein the authorized user enters or changes one or more predetermined login parameters for the online account prior to a subsequent login;
 providing, by the login server, a fake login access to the online account until one or more of the predetermined login parameters inputted by the authorized user have been met;
 providing, by the login server, a real login access to the online account when one or more of the predetermined login parameters have been met; and
 determining, by the login server, the login request to be invalid when a login request to the online account is received via the fake login access.

10. The method of claim 9, wherein one or more predetermined login parameter inputted by the authorized user corresponds to a scheduled login time, and wherein the login server provides real login access to the online account at the scheduled login time.

11. The method of claim 9, wherein one or more predetermined login parameter inputted by the authorized user corresponds to one or more IP address from which the authorized user desires to login to the online account in the future.

12. The method of claim 9, wherein one or more predetermined login parameter inputted by the authorized user corresponds to a particular login device from which the authorized user desires to login to the online account in the future.

13. The method of claim 9, wherein one or more predetermined login parameter inputted by the authorized user corresponds to a geographical location from which the authorized user desires to login to the online account in the future.

14. The method of claim 9, wherein one or more predetermined login parameter inputted by the authorized user corresponds to account freeze options including: account freeze duration or devices authorized to unfreeze the account.

15. The method of claim 9, wherein the login server receiving, via the graphical user interface, input from the authorized user indicating one or more payback options to be initiated at a device requesting access to the online account, wherein the authorized user inputs or changes one or more payback options that are to be initiated at the requesting device;

when a device not operated by the authorized user sends a request to access the online account, the login server determines the request to be invalid and initiates one or more payback options indicated by the authorized user.

16. A computer program product for managing and protecting an online account belonging to an authorized user, the computer program product comprises a tangible, non-transitory computer readable medium having instructions stored thereon that, when executed by a processor, cause the processor to:

communicate with one or more computer devices operated by the authorized user over one or more computer networks, wherein the authorized user has personal assets maintained in the online account;

display, on the one or more computer devices, a graphical user interface to the authorized user, wherein the graphical user interface provides the authorized user with control over multiple different protection layers of the online account;

receive, via the graphical user interface, input from the authorized user that indicates one or more predetermined login parameters, wherein the graphical user interface enables the authorized user to enter or change the one or more predetermined login parameters for the online account prior to a subsequent login;

provide a fake login access to the online account until the one or more predetermined login parameters inputted by the authorized user have been met;

provide a real login access to the online account when the one or more predetermined login parameters have been met; and determine the login request to be invalid when a login request to the online account is received via the fake login access.

17. The computer program product of claim 16, wherein the processor caused to receive input from the authorized user indicating one or more payback options to be sent to a device requesting access to the online account, wherein the graphical user interface enables the authorized user to input or change one or more payback options that are to be initiated at the requesting device.

18. The computer program product of claim 17, wherein the processor caused to determine a request to be invalid and initiate the one or more payback options when a device not operated by the authorized user sent the request to access the online account.

19. The computer program product of claim 16, wherein the processor caused to receive one or more predetermined login parameters corresponding to a scheduled login time, and wherein the processor caused to provide real login access to the online account at the scheduled login time.

20. The computer program product of claim 16, wherein the processor caused to receive one or more predetermined login parameters corresponding to: one or more IP address, a particular login device, a geographical location from which the authorized user desires to login to the online account in the future, or account freeze options.

* * * * *